(12) United States Patent
Burns et al.

(10) Patent No.: US 11,235,266 B2
(45) Date of Patent: Feb. 1, 2022

(54) FILTER CARTRIDGE AND/OR MULTIPLE-DIAMETER MULTIPLE STAGE FILTER COALESCER SEPARATOR

(71) Applicant: Parker-Hannifin Corporation, Cleveland, OH (US)

(72) Inventors: Jack David Burns, Aledo, TX (US); Stephen Jeane, Mineral Wells, TX (US); Andrew Dye, Aledo, TX (US); Jeremy Stevens, Weatherford, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 2 days.

(21) Appl. No.: 16/930,669

(22) Filed: Jul. 16, 2020

(65) Prior Publication Data
US 2020/0346141 A1 Nov. 5, 2020

Related U.S. Application Data

(63) Continuation of application No. 16/362,265, filed on Mar. 22, 2019, now Pat. No. 10,758,850.
(Continued)

(51) Int. Cl.
*B01D 29/58* (2006.01)
*B01D 29/96* (2006.01)
(Continued)

(52) U.S. Cl.
CPC ............ *B01D 29/96* (2013.01); *B01D 29/114* (2013.01); *B01D 29/52* (2013.01); *B01D 29/58* (2013.01);
(Continued)

(58) Field of Classification Search
None
See application file for complete search history.

(56) References Cited

U.S. PATENT DOCUMENTS 4,047,877 A * 9/1977 Flanagan ............... F23C 13/00
431/8
5,263,404 A 11/1993 Gaucher
(Continued)

FOREIGN PATENT DOCUMENTS

CN 205164357 4/2016
CN 205948559 2/2017
(Continued)

OTHER PUBLICATIONS

U.S. Appl. No. 16/362,265, filed Mar. 22, 2019.
(Continued)

*Primary Examiner* — Chester T Barry
(74) *Attorney, Agent, or Firm* — Reinhart Boerner Van Deuren P.C.

(57) ABSTRACT

A filter cartridge with easier extraction provided by a roll-out clearance region for a radial seal is provided. The filter cartridge may be a two stage filter with the seal being located between stages and usable in a filtration vessel having a central separation wall with one or more riser pipes. Also, a new vessel is disclosed with multiple diameters for first and second stages of the housing with a larger second stage diameter as compared to the first stage, which can reduce door size and/or cause fluid flow velocities to be slower at the second stage relative to the first stage.

24 Claims, 12 Drawing Sheets

Related U.S. Application Data

(60) Provisional application No. 62/713,086, filed on Aug. 1, 2018.

(51) Int. Cl.
*B01D 29/52* (2006.01)
*B01D 35/30* (2006.01)
*B01D 29/11* (2006.01)

(52) U.S. Cl.
CPC ........ *B01D 35/30* (2013.01); *B01D 2201/316* (2013.01); *B01D 2201/347* (2013.01)

(56) References Cited

U.S. PATENT DOCUMENTS

| | | | |
|---|---|---|---|
| 5,316,320 | A | 5/1994 | Breaker |
| 5,827,430 | A | 10/1998 | Perry, Jr. et al. |
| 5,893,956 | A | 4/1999 | Perry, Jr. et al. |
| 5,919,284 | A | 7/1999 | Perry, Jr. et al. |
| 6,168,647 | B1 * | 1/2001 | Perry, Jr ................ B01D 45/02 55/319 |
| 6,206,248 | B1 | 3/2001 | Popp |
| 6,325,384 | B1 | 12/2001 | Berry, Sr |
| 6,439,415 | B1 | 8/2002 | Sailm et al. |
| 7,108,738 | B2 | 9/2006 | Burns et al. |
| 7,905,935 | B2 | 3/2011 | Clements |
| 8,066,790 | B2 | 11/2011 | Hutchinson et al. |
| 8,297,463 | B2 | 10/2012 | McQuaid et al. |
| 8,308,011 | B2 | 11/2012 | Mehta et al. |
| 8,936,661 | B2 | 1/2015 | Burns et al. |
| 8,951,333 | B2 | 2/2015 | Cabourdin et al. |
| 9,180,388 | B2 | 11/2015 | Herges et al. |
| 9,566,543 | B2 | 2/2017 | Clarke et al. |
| 9,610,526 | B2 | 4/2017 | Burns et al. |
| 9,649,584 | B2 | 5/2017 | Burns et al. |
| 9,815,012 | B2 | 11/2017 | Cloud et al. |
| 10,758,850 | B2 | 9/2020 | Burns et al. |
| 2009/0026760 | A1 | 1/2009 | Henry |
| 2009/0139403 | A1 * | 6/2009 | Darke ................ B01D 50/002 95/268 |
| 2010/0181766 | A1 | 7/2010 | Knapp |
| 2010/0224065 | A1 | 9/2010 | Clarke et al. |
| 2011/0091143 | A1 | 4/2011 | Murphy |
| 2012/0210688 | A1 | 8/2012 | Burns et al. |
| 2013/0055693 | A1 | 3/2013 | Clarke et al. |
| 2013/0062273 | A1 | 3/2013 | Burns et al. |
| 2014/0373714 | A1 | 12/2014 | Cloud |
| 2016/0023153 | A1 | 1/2016 | Burns |
| 2017/0361258 | A1 | 12/2017 | Cloud et al. |

FOREIGN PATENT DOCUMENTS

| | | |
|---|---|---|
| JP | 04-298283 | 10/1992 |
| WO | WO 98/33578 | 8/1998 |
| WO | WO 2017/091654 | 6/2017 |

OTHER PUBLICATIONS

PECO Facet, A Clarcor Company; Peach Gemini Purasep; 6 pages; Dec. 31, 2015.

David Burns; Natural Gas Pipeline Contaminant Removal Methods; Proceedings of the GPA-GCC 24th Annual Technical Conference, Kuwait City, Kuwait May 10-11, 2016, 10 pages.

PECO Facet, A Clarcor Company; Peach Gemini Gas Filter/ Coalescing Cartridges; 2 pages; Dec. 31, 2015.

* cited by examiner

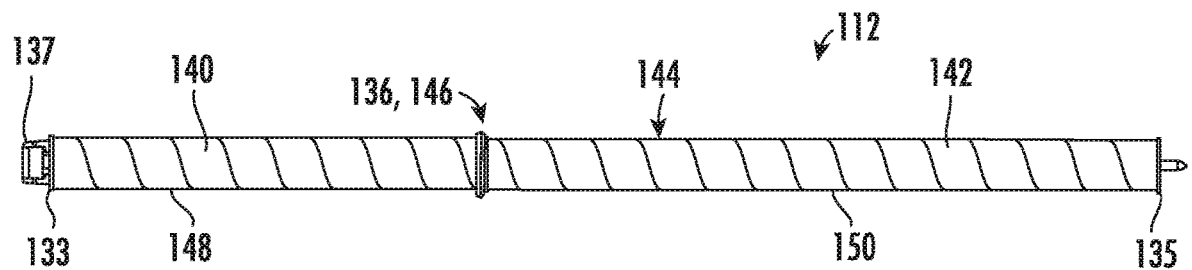
FIG. 4
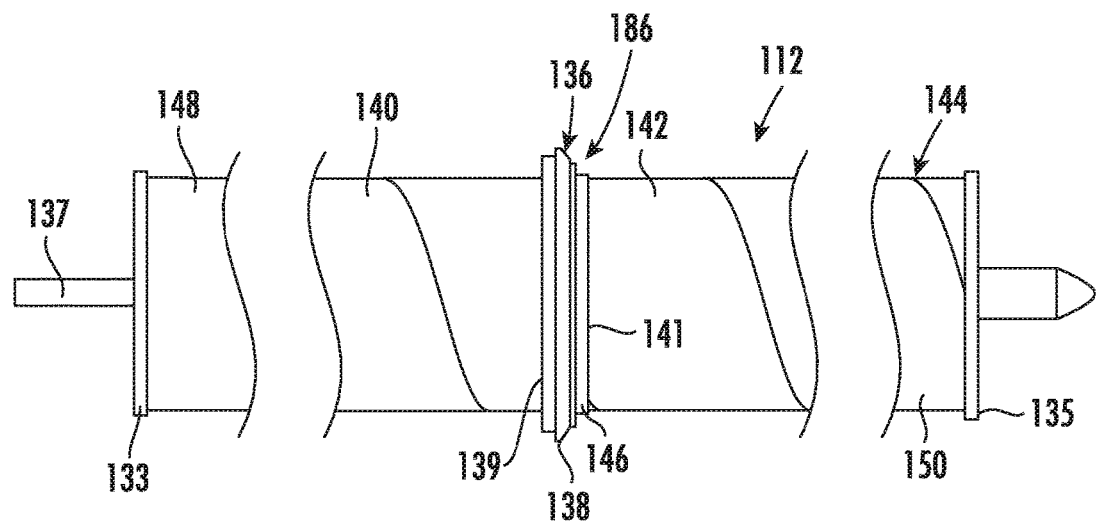
FIG. 5
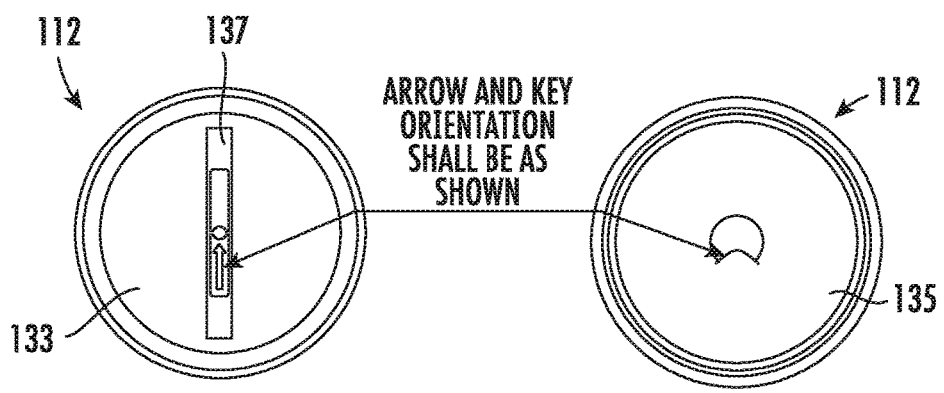
FIG. 6
FIG. 7

FILTER CARTRIDGE AND/OR MULTIPLE-DIAMETER MULTIPLE STAGE FILTER COALESCER SEPARATOR

CROSS-REFERENCE TO RELATED PATENT APPLICATIONS

This patent application is a continuation of U.S. patent application Ser. No. 16/362,265, filed Mar. 22, 2019, which claims the benefit of U.S. Provisional Patent Application No. 62/713,086, filed Aug. 1, 2018, the entire teachings and disclosure of which are incorporated herein by reference thereto.

FIELD OF THE INVENTION

The present invention generally relates to filter cartridges which may be used, for example, in coalescing applications that may have multiple stages of filtration; and/or two filtration vessels that may often have door closures for such filter cartridges.

BACKGROUND OF THE INVENTION

Filtration vessels and coalescers are generally known in the prior art as shown in U.S. Pat. No. 6,168,647 to Perry Jr et al.; U.S. Pub. No. 2012/0210688 the Burns et al.; U.S. Pub. No. 2013/0062273 to Burns et al.; and U.S. Pat. No. 7,108,738 to Burns et al., the entire disclosures of what each of these references being incorporated by reference as the different aspects of the present invention may be employed and improvements applied to these prior known filtration vessels and coalescing systems. Known keying arrangements and known sealing systems for multiple-stage filter cartridges are shown, for example, in U.S. Pub. No. 2017/0361258 to Cloud et al., which is also similarly incorporated by reference in its entirety.

The state-of-the-art also employs for these types of vessel closure devices which often include movable doors which are quite large and heavy elements such as illustrated for example in the following patent records: U.S. Pat. No. 6,439,415 entitled Closure for Equipment Sub to Salim et al.; U.S. Pat. No. 8,297,463 entitled Closure for an Equipment Sub to McQuaid; and U.S. Pat. No. 8,308,011 entitled Yoke-type Quick Opening Closure to Mehta. According to certain aspects, improvements that impact the closure are also disclosed herein and such improvements may be applied to any of these prior known vessels and closure doors exemplified by these references such that the entire disclosures of each of these references is also incorporated by reference and the different aspects of the present invention may also be employed and improvements applied to these known systems.

While some these known systems work very well such as the commercially available Gemini® filtration assemblies and other such filter assemblies sold by Parker Hannifin Filtration (US), Inc., there are significant cost considerations with such pressure vessels as well as performance considerations for coalescing and improvements herein as will be realized according to certain aspects to provide for improvements. Additionally, these assemblies typically need to be maintained with new filter cartridges installed from time to time to replace spent filter cartridges such that ease of installation and removal is a consideration. As will be realized once a certain aspect of the present application is understood, improvements to such installation and removal may be realized.

Other examples of such filtration vessels published in patent publications include US 2013/0055693; US 2010/0224065; U.S. Pat. No. 9,649,584; US 2016/0223153; and U.S. Pat. No. 5,919,284, for which aspects of the present application may be employed to improve upon.

BRIEF SUMMARY OF THE INVENTION

One inventive aspect is directed toward a filter cartridge having a roll-out clearance region for the seal ring. The filter cartridge comprises: a filter media tube; a seal holder mounted to the filter media tube, with the seal ring supported by the seal ring holder and facing radially outwardly. The seal ring is a radial seal including seal flange having an annular shape and projecting radially outwardly. A roll-out clearance region is provided by the seal ring holder on one side of the seal flange.

The seal ring holder may defines a ledge axially supporting the seal ring, with the ledge terminating at an outermost location radially inward and spaced radially inward of an innermost location of the seal flange to provide the roll-out clearance region as an annular clearance space at least partly around the ledge. For example, the outermost location may be spaced radially inward of the inward of an innermost location of the seal flange by at least 0.5 millimeter.

The seal ring holder can define a seal seating surface adjacent the ledge, with the seal seating surface radially supporting an inner periphery of the seal ring. The seal holder may further comprise a recess region on a side of the ledge opposite the seal seating surface, with the roll-out clearance region extending into the recess region, and the recess region preferably having a diameter less than the seating surface. For example, the diameter of the recess region may be at least 2 millimeters less than a diameter of the seal seating surface.

The seal ring holder may also comprise an annular abutment ridge axially spaced from the ledge by the annular seal seating surface to define a seal ring channel having a base portion of the seal ring mounted therein. Preferably, the annular abutment ridge is stepped to include a larger diameter stop flange axially spaced from the seal ring channel.

The seal ring holder may also define a seal ring channel for mounting of the seal ring. The seal ring channel has an upstream channel wall extending radially, a downstream channel wall extending radially and a channel bottom extending axially and interposed between the upstream channel wall and the downstream channel wall. To provide roll-out-clearance, the downstream channel wall may be shorter than the upstream channel wall. For example, preferably, the downstream channel wall is shorter than the upstream channel wall by at least 25%.

When an annular abutment ridge along an upstream side of the seal ring is used, the seal flange is typically angled toward a direction toward the upstream side, with the roll-out clearance region being along a downstream side of the seal ring and being of a smaller diameter than an outer diameter of the annular abutment ridge and being sized to receive the seal ring if rolled over the annular abutment ridge.

A seal ring channel for mounting of the seal may be defined in part by the annular abutment ridge and a ledge along the downstream side of the seal ring, with the ledge having an outermost diameter less than the annular abutment ridge adjacent to the seal ring.

These features may be used in a multiple stage filter cartridge, wherein the filter media tube includes a first filter stage and second filter stage that is arranged fluidically downstream of the first stage. This can provide a predetermined flow path radially inwardly through the filter media tube at the first filter stage, axially inside of the tube toward the second filter stage and radially outwardly through the filter media tube at the second filter stage. With this arrangement, the seal holder can be positioned axially between the first stage and the second stage of the filter media tube with the seal flange projecting at angle toward the first stage and away from the second stage, and with the roll-out clearance region being arranged only on the second stage.

For a multiple stage application, the seal holder may include a central opening providing fluid communication from the first stage to the second stage, with first and second closed end caps provided at opposite ends of the filter media tube to close the first stage and the second stage at opposite ends, respectively. Preferably the first closed end cap includes a handle.

The stages and the filter tube can be provided by a single continuous tube of filter media or a discontinuous tube of filter sections (that may be of the same or different type of filter). For example, in one embodiment the filter media tube comprises a first stage tube section, and a second stage tube section, wherein the seal holder is an open end cap assembly having a central opening providing a flow passage and a first cap portion secured to the first stage tube section and a second cap portion secured to the second stage tube section. In this embodiment the seal holder axially spaces the first stage tube section and the second stage tube section by being axially interposed therebetween. In the other embodiment, the filter media tube is a single continuous tube structure, wherein the seal holder comprises a sleeve arranged over the filter media tube to divide the filter media tube into the first stage and the second stage.

The seal holder may define a seal ring channel in an outer periphery thereof, wherein the seal ring comprises a chevron seal comprising an annular base portion mounted in the seal ring channel. The seal flange projects radially from the annular base portion and is canted relative to the base portion to form an annular pocket therebetween. The seal ring channel includes an upstream support wall and a downstream support wall, with the downstream support wall extending partially along the base portion.

An embodiment of an application is a filtration assembly including the filter cartridge that comprises: a filtration vessel; a partition dividing the filtration vessel into a first stage and a second stage, at least one opening in the partition being provided by a filter sealing sleeve; an inlet port in fluid communication with the first stage; an outlet port in fluid communication with the second stage; and with the filter cartridge disposed in the filtration vessel and extending through filter sealing sleeve with the seal flange radially engaging and being deflected inwardly and against the filter sealing sleeve in radial seal engagement against an inner diameter of the filter sealing sleeve.

Also provided is a method of removing a filter cartridge from within the filtration assembly. The method comprises: pulling the filter cartridge from the filter sealing sleeve of a vessel while extruding the seal from a sealed position to a release position and in which the seal flange in an extruded state projects into the roll-out clearance region and is disposed into the second stage to facilitate easier release of the filter cartridge from the filter sealing sleeve.

Another inventive aspect can be characterized as a filter cartridge with means along the seal holder and along the second stage for reducing extraction force by at least partly receiving the seal ring in a rolled over condition during removal of the filter cartridge from the filter sealing sleeve.

Such a filter cartridge is configured for use with a filtration assembly having a first stage and a second stage and a filter sealing sleeve, in which the filter cartridge comprises: a filter media tube; a seal holder mounted to the filter media tube to separate the filter media tube into a first stage and a second stage; a seal ring supported by the seal ring holder and facing radially outwardly, with the seal ring being a radial seal for radially sealing against the filter sealing sleeve.

The seal ring holder can define a ledge axially supporting the seal ring, with the ledge terminating at an outermost location radially inward and spaced radially inward of an innermost location of a seal flange of the seal ring to at least partly provide the reducing means as an annular clearance space at least partly around the ledge.

The seal ring holder may define a ledge axially supporting the seal ring, with the ledge terminating at an outermost location radially inward and spaced radially inward of an innermost location a seal flange of the seal ring to at least partly provide the reducing means as an annular clearance space at least partly around the ledge.

The seal ring holder may also comprise an annular abutment ridge along an upstream side of the seal ring, with a seal flange of the seal ring being angled toward a direction toward the upstream side. The reducing means can comprise a roll-out clearance region along a downstream side of the seal ring and can be of a smaller diameter than an outer diameter of the annular abutment ridge.

The seal ring holder may further define a seal ring channel having an upstream channel wall extending radially, a downstream channel wall extending radially and a channel bottom extending axially and interposed between the upstream channel wall and the downstream channel wall. The downstream channel wall can be shorter than the upstream channel wall, with the seal ring channel receiving the seal ring.

Another inventive aspect is directed toward a multiple diameter filter housing. An assembly for fluid filtration, comprises: a housing, and at least one filtration element supported within the housing. The housing includes: i) an upstream housing portion with an inlet port for receiving a fluid stream to be filtered, ii) a downstream housing portion with an outlet port for discharging a filtered fluid stream, iii) a separation wall between the upstream and downstream housing portions, wherein the at least on filtration element is sealing and removably supported within an aperture of the fluid separation wall, enabling fluid entering the inlet port to flow into the filtration element through an upstream portion of the filtration element and out of the filtration element through a downstream portion of the filtration element to the outlet port; and iv) a door on the upstream portion enabling access to the at least one filtration element, the upstream housing portion having an outer diameter that is smaller than an outer diameter of the downstream housing portion.

The outer diameter of the upstream housing portion may smaller than an outer diameter of the downstream housing portion so that that fluid exiting the element at the downstream portion has a lower velocity than fluid entering the filtration element at the upstream portion.

The housing may comprise a filtration vessel having an open end at the upstream housing portion and a closed end at the downstream housing portion in axially spaced relation, with the at least one filtration element extending horizontally within the filtration vessel in parallel fluid circuit with each filtration element comprising a first stage and a second stage. Each filtration element can comprise a ring seal in radial sealing engagement with a corresponding tubular sealing support riser of the separation wall to divide each filtration element into the first stage and the second stage. The inlet port can extend radially through the upstream housing portion, and the outlet port can extend radially through the downstream housing portion.

The assembly may further include an inlet support grid and an outlet support grid spaced on opposite sides of the separation wall. The inlet support grid supports the filtration elements along the upstream housing portion and the outlet support grid supports the filtration elements along the downstream housing portion. The inlet support grid has a first outer diameter matched to the upstream housing portion and the outlet support grid has a second outer diameter matched to the downstream housing portion with the second outer diameter being larger than the first outer diameter.

Preferably, the separation wall has a separation wall diameter matched to that of the upstream housing portion and the first outer diameter, thereby being smaller than the second outer diameter.

The assembly may also include a transition provided by a conical neck portion interposed between the downstream housing portion and the upstream housing portion with the conical neck section having spaced apart annular welds at different diameters that connect with respectively a smaller diameter cylindrical housing section and a larger diameter cylindrical housing section.

The smaller diameter housing section may entirely provide for the upstream housing portion and can extend past the separation wall to form part of the downstream housing portion. The door has a mating interface at a door mating diameter for mating with the upstream housing portion that is matched with the outer diameter of the upstream housing portion, so that the door mating diameter is less than the outer diameter of the downstream housing portion. For example, preferably, the door mates with the upstream housing portion at a mating interface at a diameter that is at least 10% less than the outer diameter of the downstream housing portion.

Preferably, the outer diameter of the upstream housing portion is smaller than the outer diameter of the downstream housing portion by between 5 and 40%. More preferably, the outer diameter of the upstream housing portion is smaller than the outer diameter of the downstream housing portion by between 15 and 25%.

For most applications, the outer diameter of the upstream housing portion is between 0.15 and 3 meters; and the outer diameter of the downstream housing portion is between 0.2 and 3.5 meters.

The upstream housing portion may transition to a larger diameter to the downstream housing portion radially outward of the second stage and axially between the separation wall and the outlet support grid. For example, this may preferably be done by a conical portion.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 4 is a side elevational view of a preferred embodiment of a filter cartridge similar to that of the embodiment shown in FIGS. 2-3 and also usable and employed in the assembly shown in FIG. 1, and can be in place of the filter cartridge shown in FIGS. 2-3;

FIG. 5 is an enlarged view of the filter cartridge shown in FIG. 4 with break lines used to better illustrate details of the central region as well as end regions thereof and with the cartridge rotated 90° relative to FIG. 4.

FIG. 6 is a first-stage axial end view of the filter cartridge shown in FIG. 4.

FIG. 7 is a second-stage end view of the filter cartridge shown in FIG. 4.

FIG. 13 is a partly schematic and cross-sectional view of the filter cartridge of FIG. 4 installed into the riser pipe as shown in FIG. 1 with radial seal engagement there between.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
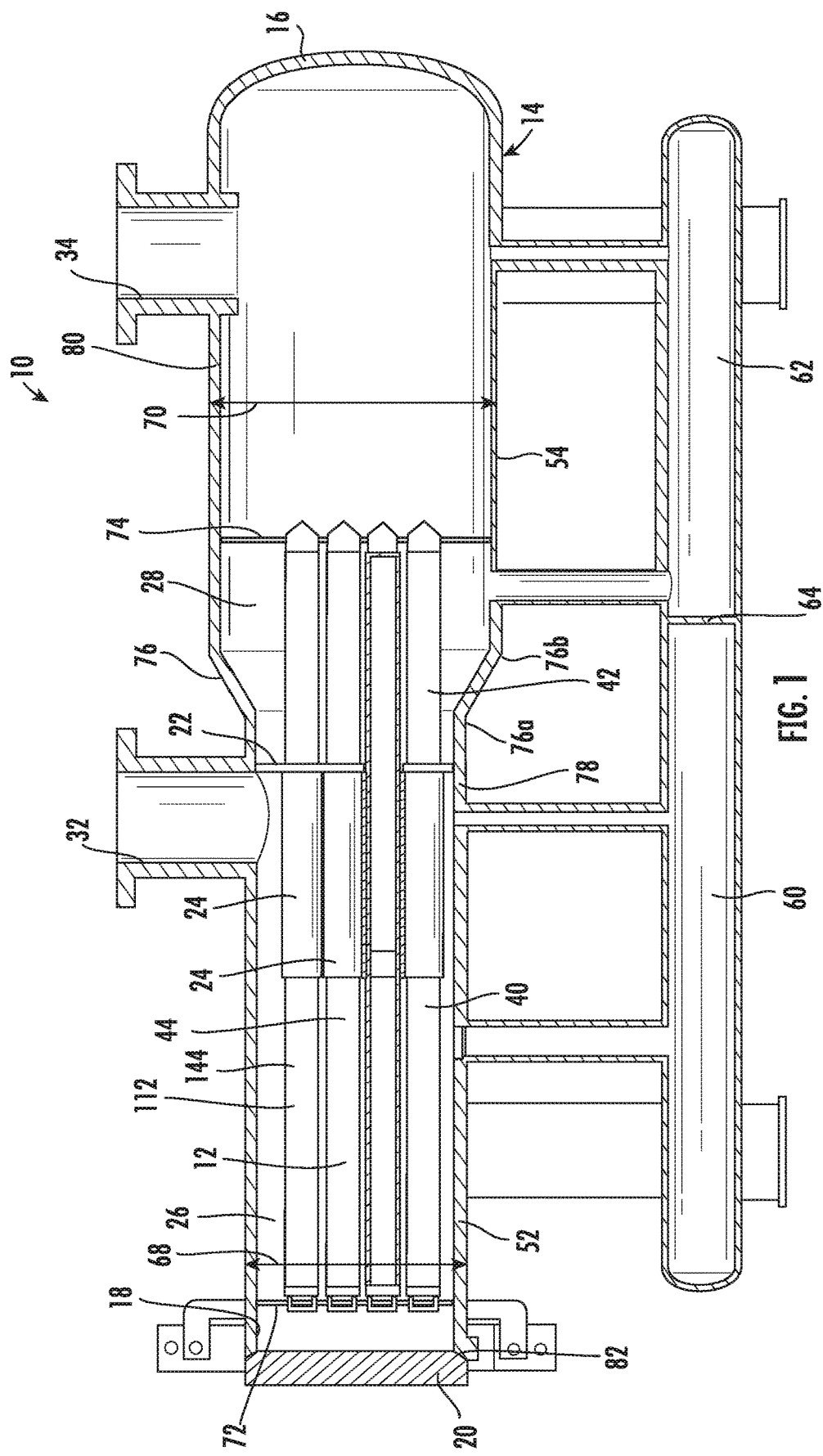
FIG. 1 is a side elevational view in partial cross-section of an embodiment of a multi-stage vessel incorporating multiple separator/coalescer filter cartridges according to an embodiment of the present invention (herein filtration element is used synonymously with filter cartridge) such as one or more of the filter cartridges shown in any of FIGS. 2-15)

Turning to FIG. 1, a filter cartridge 12 (also referenced as a filter or filtration element) is shown in use in a filtration assembly 10 incorporating one or more of the filter cartridges 12 in parallel fluid circuit, in accordance with an embodiment of the present invention.

To provide a housing for the filter cartridges 12, the assembly 10 includes a filtration vessel 14 that may be a generally cylindrical steel body that can hold considerable pressure for examples as discussed in the background that extends between a domed closed end 16 and having an open end 18, in which the open end 18 is closed by a movable door 20. The movable door 18 may pivot about a vertically extending axis relative to the vessel 14 to move between an open position allowing access for maintenance and filter change-out and a closed operational position in sealing relationship over the open end for filtration (see e.g. door closure example in U.S. Pat. No. 8,297,463 entitled "Closure for an equipment sub" which may be employed here).

Further, a separating wall is provided by partition 22 with preferably one or more riser pipes 24 that provide filter sealing sleeves for each of the respective filter cartridges 12. This divides the filtration vessel 14 into a first upstream stage 26 and a second downstream stage 28. One or more openings 30 in the partition 22 are provided by the riser pipes 24 as shown.

Further an inlet port 32 is provided through the vessel 14 such as by a vertical riser having a mounting flange that is in fluid communication with the vessel's first upstream stage 26, and an outlet port 34 is provided through the vessel 14 such as by a vertical riser having a mounting flange that is in fluid communication with the vessel's second downstream stage 28. Therefore, with the vessel being generally cylindrical about a central horizontal axis, the inlet port 32 extends radially through the upstream housing portion and the outlet port 34 extends radially through the downstream housing portion.

Figure 2:
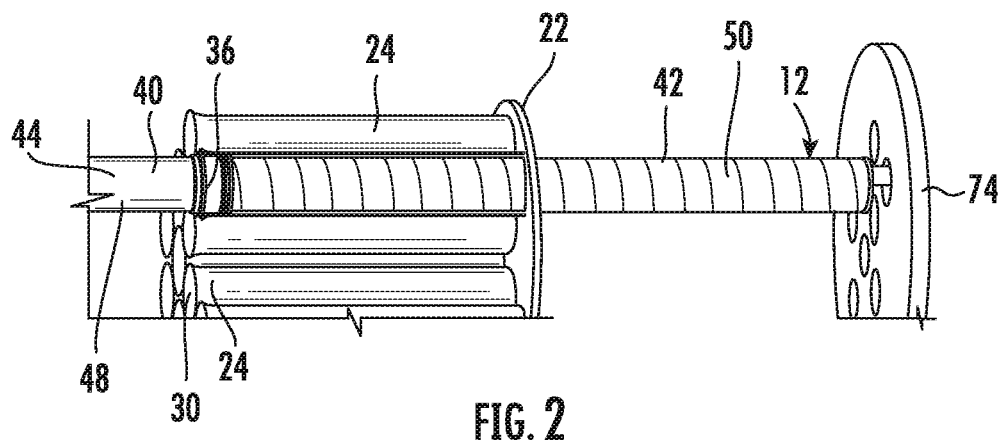
FIG. 2 is an isometric view of a portion of the assembly shown in FIG. 1 with many components removed to simply illustrate one embodiment of a two-stage filter cartridge installed within a riser pipe of a separation wall in spaced relation to the outlet port grid for the assembly shown in FIG. 1.
Figure 2A:
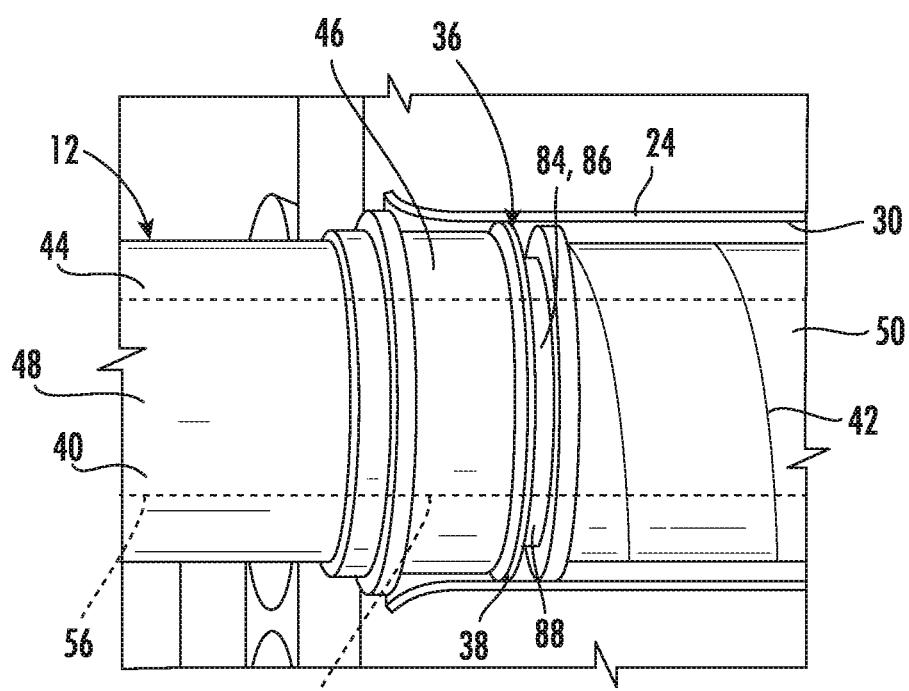
FIG. 2A is an enlarged view of a portion of FIG. 2 to better illustrate the sealing region between the riser pipe and the filter cartridge when in use.
Figure 13:
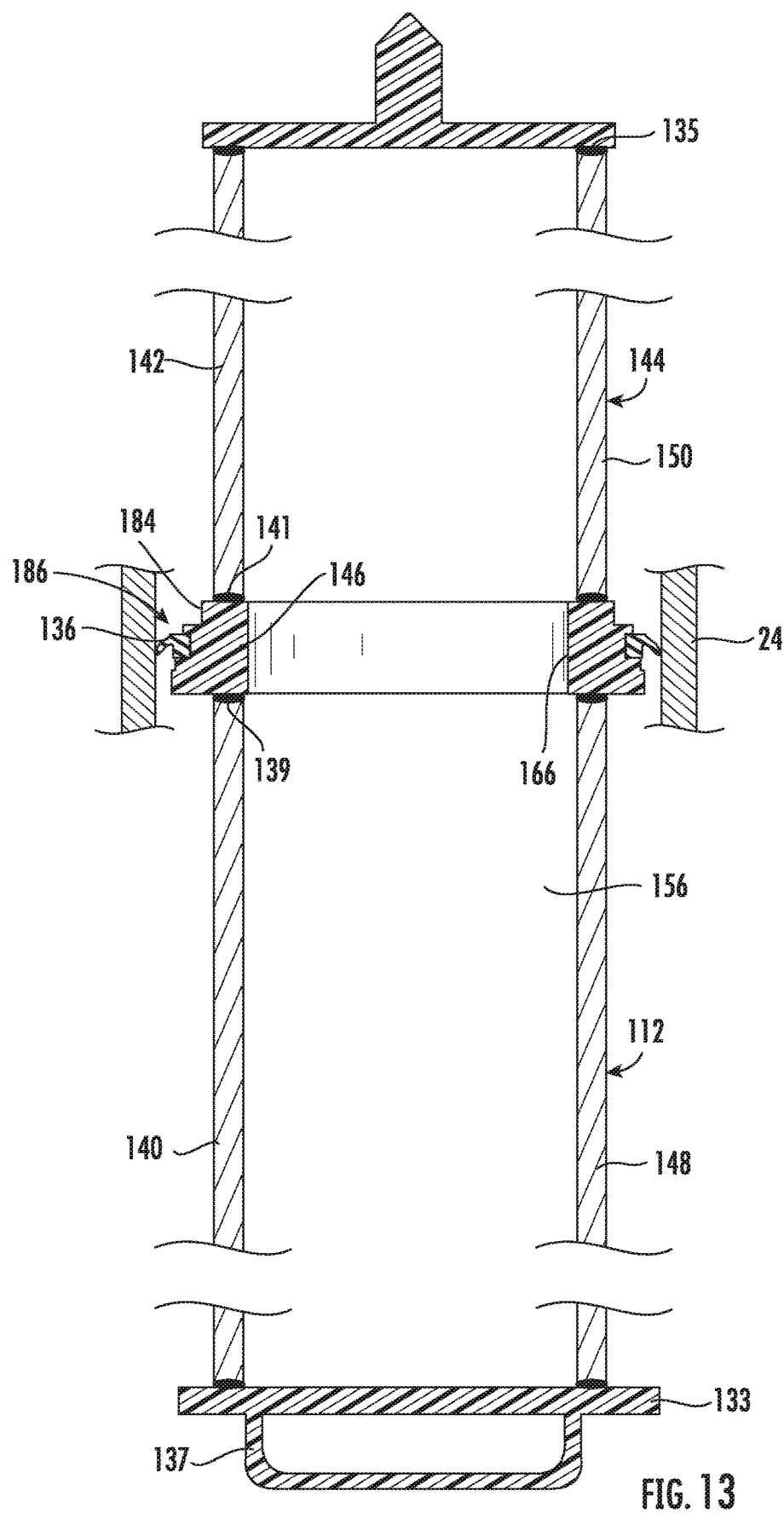
Figure 14:
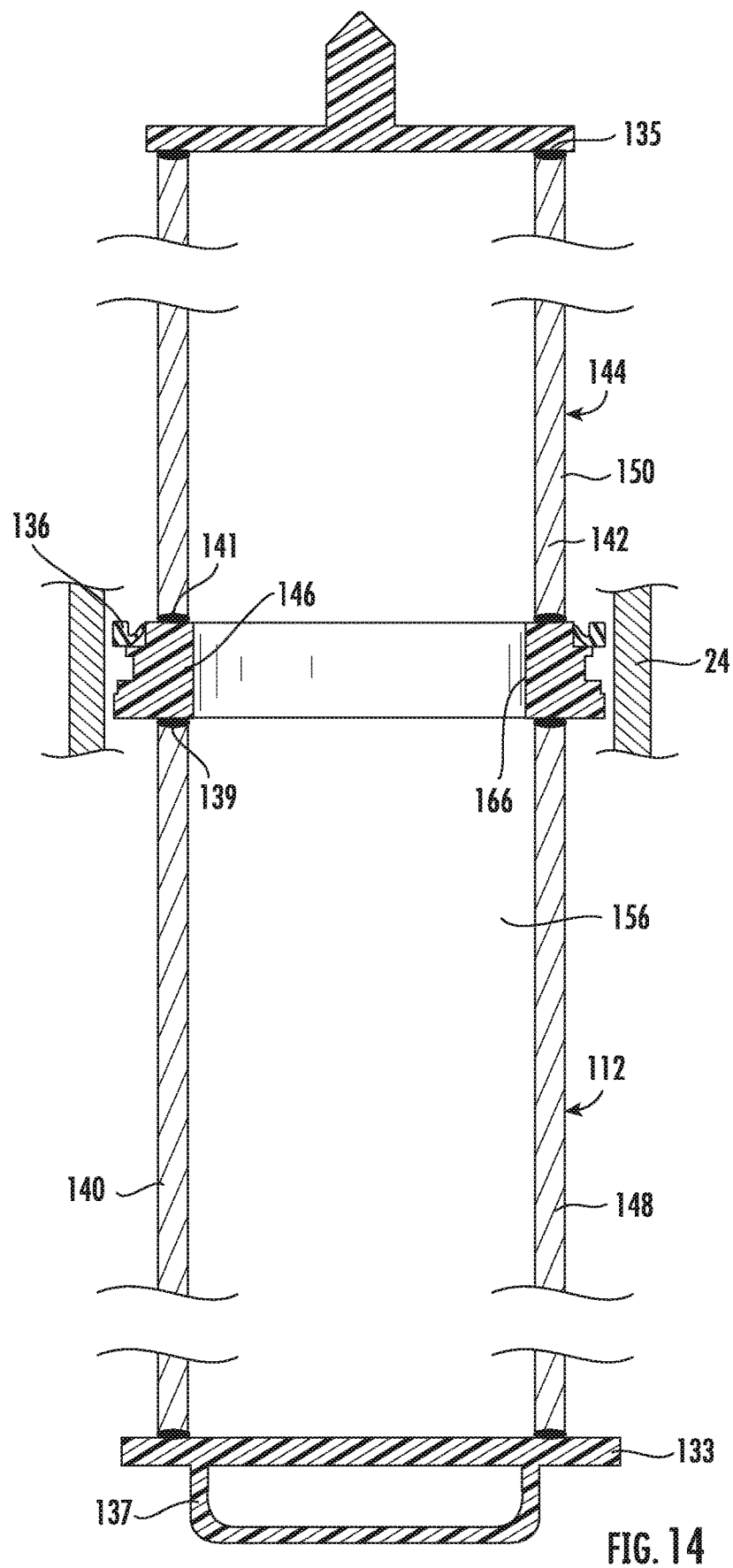
FIG. 14 is a partly schematic demonstrative view similar to that of FIG. 13 but illustrating the filter cartridge as it is being pulled out with the seal ring rolled over into the clearance region provided by these seal holder that may occur during removal of the filter cartridge to ease filter cartridge extraction.

As shown in FIG. 1 and even better in FIG. 2 (see also FIGS. 13-14), the filter cartridge 12 is disposed in the filtration vessel 14 and extends through filter sealing sleeve (e.g. riser pipe 24). The filter cartridge 12 incorporates a seal ring 36 that faces radially outwardly with a seal flange 38 that is preferably configured as a deflectable wiper seal (and/or optionally compressible) that radially engages and is being deflected inwardly and against the inner tubular surface of the riser pipe 24, thereby in radial seal engagement against an inner diameter of the filter sealing sleeve.

The riser pipe 24 may flare outwardly toward the open end 18 to allow for centering effect during installation. Further, preferably the vessel 14 along with the riser pipes 24 and central axes of the one or more filter cartridges are arranged horizontally. This configuration affords horizontal installation and removal for filter cartridges which is particularly convenient and conventionally employed for example in Gemini® filtration vessels sold by Parker Hannifin Filtration (US), Inc.

Figure 15:
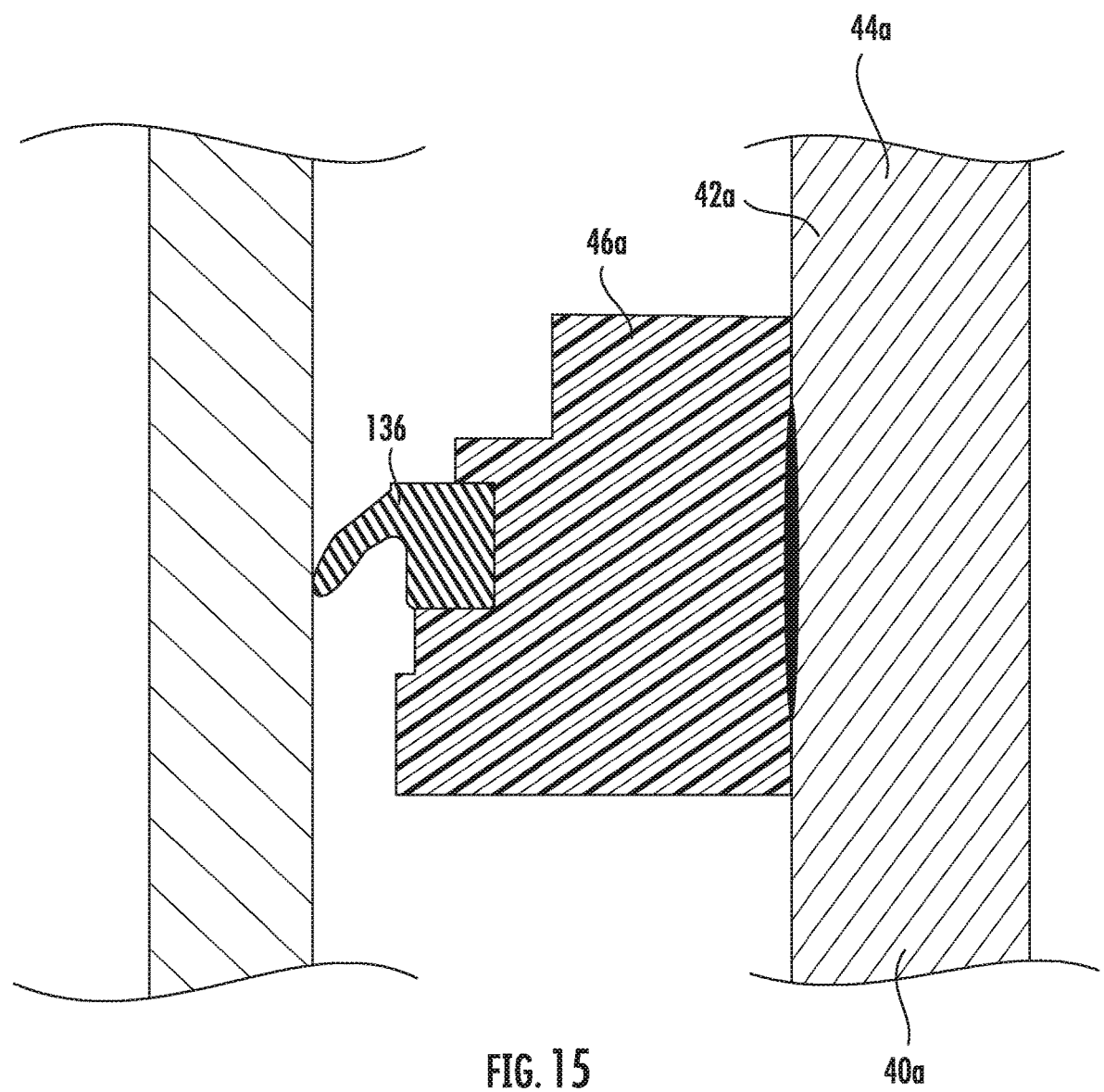
FIG. 15 is another preferred embodiment of the filter cartridge similar to that shown in FIGS. 4-14 but additionally showing that the filter media tube may either be separate sections as shown in earlier embodiments or a single continuous and unitary tube according to FIG. 15.

As shown in FIG. 2, each filter cartridge 12 comprises a first filter stage 40 upstream of the seal ring 36 and a second filter stage 42 downstream of the seal ring 36. The filter cartridge 12 includes a filter media tube 44 (which may be either a continuous single tube or separate tube sections that make up tube 44, for example) and may include a seal holder 46 to support and hold the seal relative to the tube 44. In a single continuous filter media tube 44a example as shown in alternative embodiment FIG. 15, the seal holder may take the form of a sleeve 46a surrounding the continuous filter media tube 44a by being slid upon and sealingly bonded thereto such as by welding or adhesive, thereby also provide for first stage 40a and second stage 42a, separated by the seal. In the other illustrated embodiments such as in FIG. 2, the sleeve holder 46 is an intermediate end cap that secured first stage filter tube section 48 and second stage filter tube section 50, that together provide the filter media tube 44.

In both embodiments, the filter media tube 44 includes the first filter stage 40 and the second filter stage 42 that is arranged fluidically downstream of the first stage with a predetermined flow path radially inwardly through a central cavity 56 that provides an axially extending central flow passage therethrough, which is preferably open to free fluid flow to minimize restriction. During filtration, unfiltered fluid passes from the inlet port 32 into the inlet chamber provided by the vessel first upstream stage 26, radially through the filter media tube 44 (i.e. the first filter stage 40) to coalesce and thereby filter out undesirable contaminants. Then, the fluid can pass axially through the central passageway within the filter cartridge provided by the central cavity 56 toward the second filter stage 42, where fluid can flow radially outwardly through the filter media tube 44 to again coalesce and thereby filter out undesirable contaminants. A perforated tubular baffle 58 (FIG. 3) may surround the filter media tube at the second filter stage 42 to provide back-pressure and help with separation. As such, filtered fluid having coalesced liquids removed and/or other undesirable particulars enter the outlet chamber provided by the vessel second downstream stage 28, whereby filtered fluid can exit the vessel through outlet port 34.

To facilitate fluid flow through the central cavity 56, the seal holder 46 (or 46a shown in FIG. 15) whether it be an end cap or a sleeve has a central opening 66 to provide for fluid communication therethrough to allow for communication between filter stages.

Liquid droplets in the inlet chamber provided by the vessel first upstream stage 26 may gravitationally drain from the vessel into inlet sump 60. Coalesced liquids in the outlet chamber provided by the vessel second downstream stage 28 may gravitationally drain from the vessel into outlet sump 62, which is adjacent to inlet sump but separated by an imperforate wall 64, due to different pressures between stages.

In accordance with one inventive aspect, the housing provided by the vessel 14 (closed by the movable door 20), includes an upstream housing portion 52 (with inlet port 32) for receiving an unfiltered fluid stream to be filter; and a downstream housing portion 54 (with outlet port 34) for discharging a filtered fluid stream, which are configured with respectively smaller and larger dimensions. For example, the upstream housing portion has an outer diameter 68 that is smaller than an outer diameter 70 of the downstream housing portion.

The outer diameter 68 of the upstream housing portion 52 can be smaller than an outer diameter 70 of the downstream housing portion 54, so that that fluid exiting the element at the downstream portion of the filtration element (e.g. second filter stage 42) has a lower velocity than fluid entering the filtration element at the upstream portion (e.g. first filter stage 40). This can allow for better filtration and/or less retained undesirable materials at the second stage.

The outer diameter 68 of the upstream housing portion 52 can be smaller than an outer diameter 70 of the downstream housing portion 54, to provide for the advantage that the movable door 20 is considerably smaller. These doors can be considerably expensive considering such housings are made from considerably thick steel for high pressure applications. This also provides weight issues. By affording a smaller diameter 68 at the upstream housing portion 52, the size of the door 20 can be made smaller. Considerable cost savings are realized especially considering the sizeable proportion the door closure makes to such assemblies.

With reference to the embodiment of FIG. 1, the assembly 10 further includes an inlet support grid 72 and an outlet support grid 74 spaced on opposite sides of the separation wall provided by the partition 22. The inlet support grid 72 supports the filter cartridges 12 along the upstream housing portion 52. The outlet support grid 74 supports the filter cartridges 12 along the downstream housing portion 54. The inlet support grid 72 is removable and insertable into the vessel 12 to facilitate filter change out, and can have a first outer diameter matched to the upstream housing portion 52 as illustrated. The outlet support grid 74 may be permanent in that it is not removed during filter change out, and can have a second outer diameter matched to the downstream housing portion 54. For the respective outlet grid 74 and inlet grid 72, the second outer diameter is larger than the first outer diameter. The inlet grid and the outlet grid can be mounted to the inside periphery of the vessel, thereby matching in diameters at respective locations. By "match" in this context and as used herein, it is meant that it is equal, or closely corresponding or complimentary to, for example very close or similar such as within the relative thickness of the vessel wall for interfitting and/or for example less than 5% difference in dimension.

Further, the separation wall provided by partition 22 can have a separation wall diameter matched to that of the upstream housing portion 52 (and similarly matched to the first outer diameter of the inlet grid 72), thereby being smaller than the second outer diameter of the downstream housing portion 54.

To provide a transition, preferably the vessel 14 includes a conical neck portion 76 (that can be provided a neck section of steel material) interposed between the downstream housing portion 54 and the upstream housing portion 52 as shown, and more specifically located preferably in abutting relation between a smaller diameter cylindrical housing section 78 and a larger diameter cylindrical housing section 80. The conical neck section 76 has spaced apart annular welds 76a, 76b at different diameters. These welds connect the neck section 76 respectively with the smaller diameter cylindrical housing section 78 and the larger diameter cylindrical housing section 80.

All of these housing sections can be made from relatively thick steel material in annular sections that are welded together at junctions, to provide for a pressure vessel having a rating capacity preferably of at least 100 psi, typically at least several hundred psi and preferably more than 1000 psi.

The smaller diameter housing section 78 can entirely provide for the upstream housing portion 52 and extends past the separation wall provided by partition 22 to form the most upstream part (e.g. part located closed to the partition 22) of the downstream housing portion 54. An advantage is that the door 20 can have a mating interface 82 at a door mating diameter for mating with the upstream housing portion 52 that is matched with the outer diameter of the upstream housing portion 52, and thereby the door mating diameter is less than the outer diameter of the downstream housing portion 54.

Preferably, door mates with the upstream housing portion at a mating interface at a diameter that is at least 10% less than the outer diameter of the downstream housing portion, more preferably at least 15% less to realize significant weight and cost savings. To balance weight and door size advantages versus filtration efficiency and fluid speeds, the outer diameter of the upstream housing portion is smaller than the outer diameter of the downstream housing portion typically by between 15 and 25%.

The outer diameter of the upstream housing portion 52 can be smaller than the outer diameter of the downstream housing portion 54 by between 5 and 40%. There are a variety of sizes and number of filter elements depending upon applicant for such vessels, and, for example the outer diameter of the upstream housing portion 52 will most usually be between 0.15 and 3 meters; and the outer diameter of the downstream housing portion 54 will usually be between 0.2 and 3.5 meters, for typical applications, although other possibilities exist.

With this arrangement, the upstream housing portion 52 transitions to a larger diameter to the downstream housing portion 80 radially outward of the second filter stage 42, and axially between the separation wall by partition 22 and the outlet support grid 74.

Figure 3:
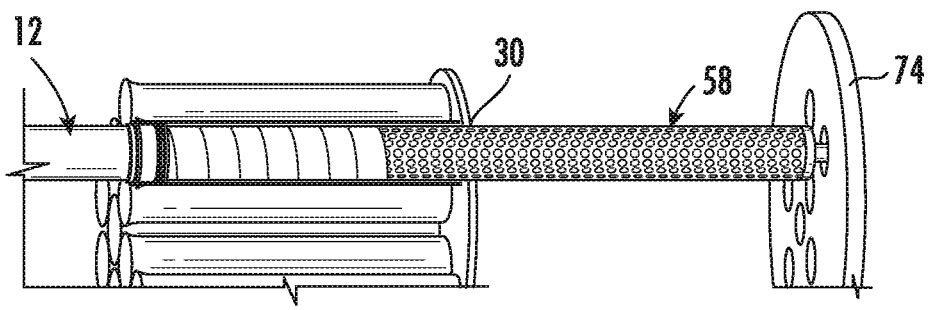
FIG. 3 is the same view as FIG. 2 but additionally showing a perforated baffle that covers at least the second stage portion of the filter cartridge.
Figure 8:
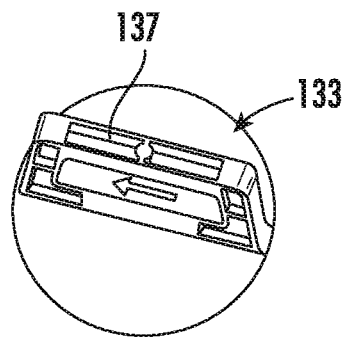
FIG. 8 is an isometric view of the first stage end cap employed in FIG. 4.
Figure 9:
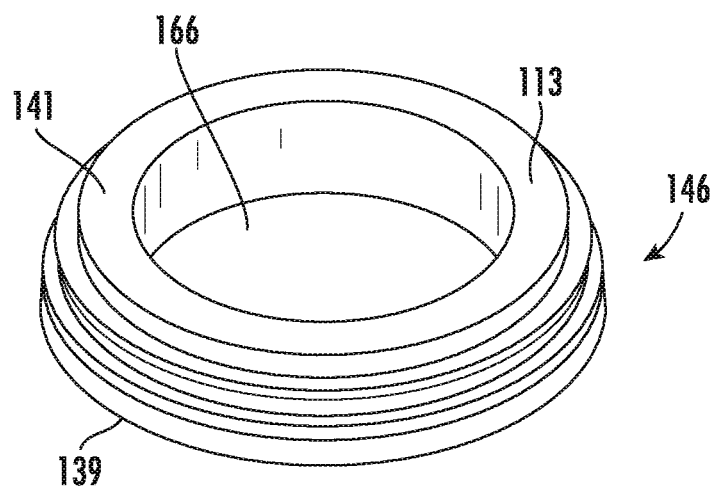
FIG. 9 is an isometric view of the seal-holder component of the filter cartridge employed in FIG. 4.
Figure 10:
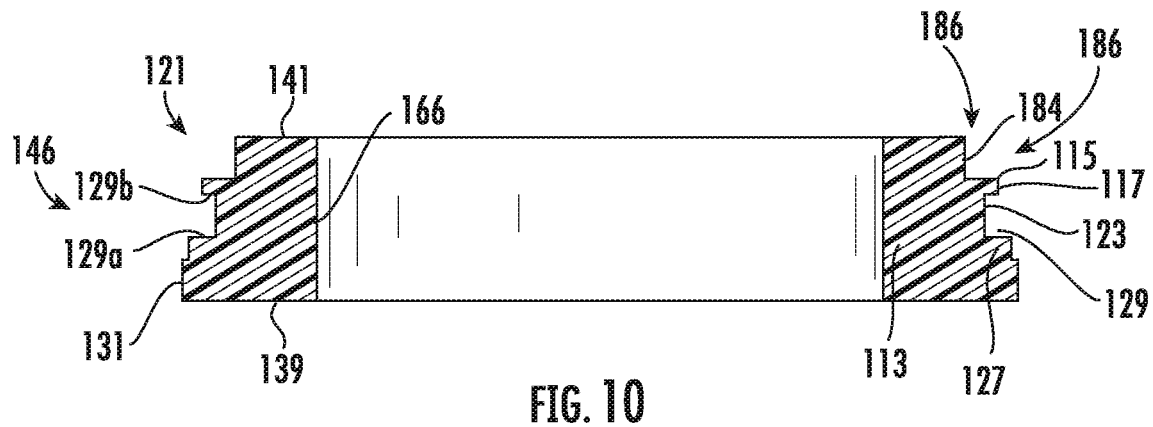
FIG. 10 is a cross-section view of the seal-holder component shown in FIG. 9 taken through the central axis thereof (while not limited thereto, FIGS. 9-10 can depict an example seal holder embodiment that is to scale—see alternative embodiments also described herein).
Figure 11:
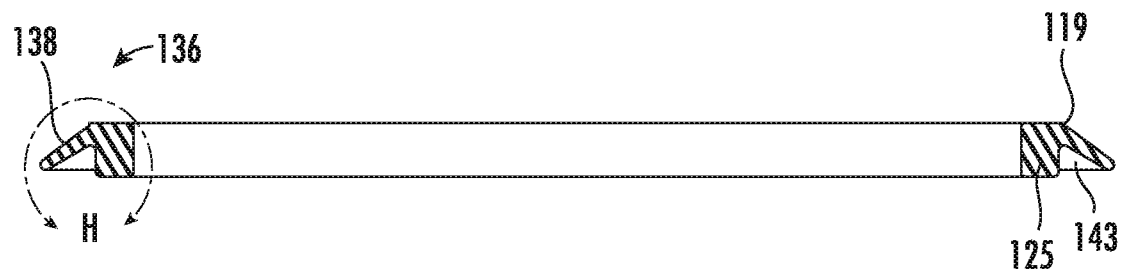
FIG. 11 is a cross-sectional view of the seal ring employed in the filter cartridge of FIG. 4 and that may also be employed in the filter cartridge of FIGS. 3-4.
Figure 12:
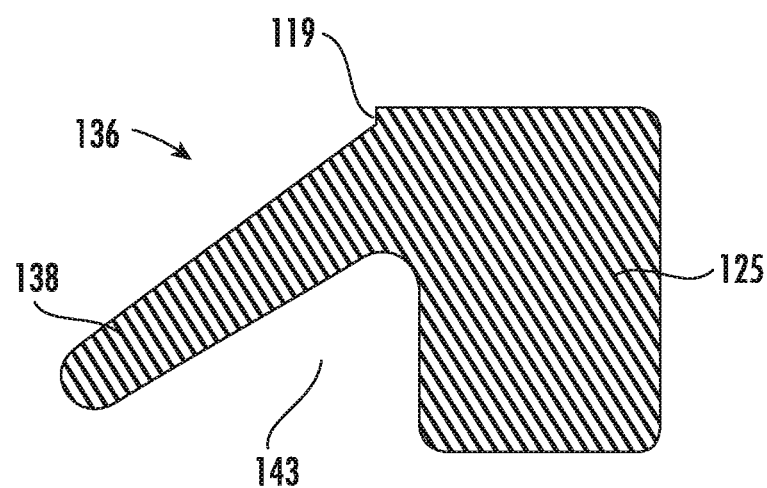
FIG. 12 is an enlarged view of a portion of the cross-section of FIG. 11 taken about Circle H (while not limited thereto, FIGS. 11-12 can depict an example of a seal ring to scale).

Another aspect that can be used not only in a multiple diameter vessel, but is also applicable to retrofit and use in existing Gemini® or other housing or vessel applications is to provide the filter cartridge with a roll-out clearance region 86, that may be provided by a groove 84 and/or reduced height downstream ledge provided by channel support wall 88 in the embodiment of FIGS. 2-3. Likewise, the multiple diameter vessel aspects can be used with a more conventional filter cartridge as described in the background section, without the seal roll-out region.

In particular, the first filter cartridge 12 embodiment has a roll-out clearance region provided any the annular groove 84 in the seal holder 46, along the downstream side of the wall, and with a shorter downstream support ledge which allows during filter extraction and pulling from the riser pipe 24 the annular seal flange 38 of the seal ring 36 to more easily roll over and reduce frictional engagement with the riser pipe 24 to facilitate easier extraction. If the seal ring 36 is entirely extracted, the annular groove 84 can capture the seal (see e.g. demonstrative examples of FIGS. 14A and 14B, which will be later discussed further).

A more preferred filter cartridge 112 is illustrated in FIGS. 4-14 that is usable and also employed in the assembly 10 of FIG. 1 illustrating its interchangeability with other filter cartridges such as the filter cartridge 12 shown in FIGS. 2-3. It is contemplated that more typically the filter cartridges of the assembly 10 will most typically all be of the same type and arranged in parallel, and is shown as such for demonstrating interchangeability. As such, like numbers will typically be used to demonstrate common or similar features, with the later embodiment starting in the 100 series, and it is understood that similarly referenced features operate similarly such that disclosure in one embodiment is applicable to the other embodiment. For example, the discussion and disclosure pertaining to FIGS. 4-14 is applicable to the embodiment of FIG. 2-3 unless otherwise indicated and vice versa.

Referring to FIGS. 4-14, a preferred embodiment of the filter cartridge 112 employs a filter media tube 144 that also may similarly have central cavity 156 for an axial fluid flow passageway, and a seal holder 146 mounted to the filter media tube 144. A seal ring 136 is supported by the seal ring holder 146 and faces radially outwardly. The seal ring 136 is a radial seal and includes seal flange 138 having an annular shape and projecting radially outwardly. Further, a roll-out clearance region 186 is provided by the seal ring holder 146 on one side of the seal flange 138 that can receive part or all of the seal ring.

The seal material of seal ring 136 can be made of suitable elastomeric materials and are readily deformable and deflectable upon manual pressure when used during installation to cause a radial seal to be formed. For example, examples of seal synthetic rubbers, such as, but not limited to Nitrite Rubber or Buna; Hydrogenated Nitrile Butadiene Rubber; Ethylene Propylene Diene Monomer Rubber or EPDM; and Viton. On the other hand, the seal holder 146 is more rigid than the seal ring 136, such as being a non-deformable molded or machined hard thermoplastic member, and is configured to provide support for the seal ring 136 and to facilitate attachment of the seal ring 136 to the filter media tube.

To provide for the roll out clearance region 186, the seal ring holder 146 may have a generally cylindrical inner body 113 with an outer periphery that defines various features for support such as mechanical attachment whereby the seal can be stretched and retained in a structural channel.

For example, the seal ring holder 146 includes a ledge 115 axially supporting the seal ring 136. The ledge 115 terminates at an outermost location 117 radially inward and spaced radially inward of an innermost location 119 of the seal flange 138. This provides the roll-out clearance region 186 as an annular clearance space 121 at least partly around the ledge.

One way this can work is that the ledge 115 now provides less support along the back downstream side of the seal allowing it to bulge and more easily deform during extraction to allow roll out of the seal into the location of annular clearance space 121. The area above the ledge 115 can therefore receive part of the seal ring and thereby provide for the roll-out clearance region.

While other ranges are possible, preferably the outermost location 117 is spaced radially inward of the inward of an innermost location 119 of the seal flange by at least 0.5 millimeter, and more preferably at least 1 millimeter and/or may be between 0.5 and 3 millimeters in radial spacing.

The seal ring holder 146 may also define a seal seating surface 123 adjacent the ledge 115 with the seal seating surface 123 radially supporting an inner periphery of the seal ring 136. For example the seal ring 136 may include an annular base portion 125 for seating against the seating surface 123, which may have a block shape that is generally rectangular as shown.

Further, the seal holder 146 further comprises a recess region 184 on a side of the ledge 115 opposite the seal seating surface 123 with the roll-out clearance region 186 preferably extending into the recess region 184.

As illustrated, the recess region 186 has a diameter less than the seating surface 123. For example, the diameter of the recess region 184 may be at least 2 millimeters less than a diameter of the seal seating surface 123, and preferably in a range between 2.5 and 8 millimeters less.

The seal holder 146 may further comprise an annular abutment ridge 127 axially spaced from the ledge 115 by the annular seal seating surface 123 to define a seal ring channel 129 having the base portion 125 of the seal ring 136 mounted therein, such as by resiliently stretching and snapping the seal ring over the seal ring holder into the channel 129. Preferably, the seal ring 136 will provide a radially inward resilient force upon seating surface 123.

The annular abutment ridge 127 can be stepped to include a larger diameter stop flange 131 axially spaced from the seal ring channel 129. The stop flange 131 can provide a surface to radially stop or limit movement of the filter cartridge in the riser pipe in the radial direction considering the resiliency of the seal, to better ensure radial sealing engagement when in use.

The seal ring channel 129, can have an upstream channel wall 129a extending radially, a downstream channel wall 129b extending radially and a channel bottom provided by the seating surface 123 that extends axially and interposed between the upstream channel wall 129a and the downstream channel wall 129b. To achieve roll out features, another way can be provided by having the downstream channel 129b wall shorter than the upstream channel wall 129a. Preferably, the downstream channel wall 129b is shorter than the upstream channel wall by at least 25%, and more preferably at least 35% short and most preferably between 40-60% shorter, for example being shown as 50% shorter in the embodiment).

Figure 13A:
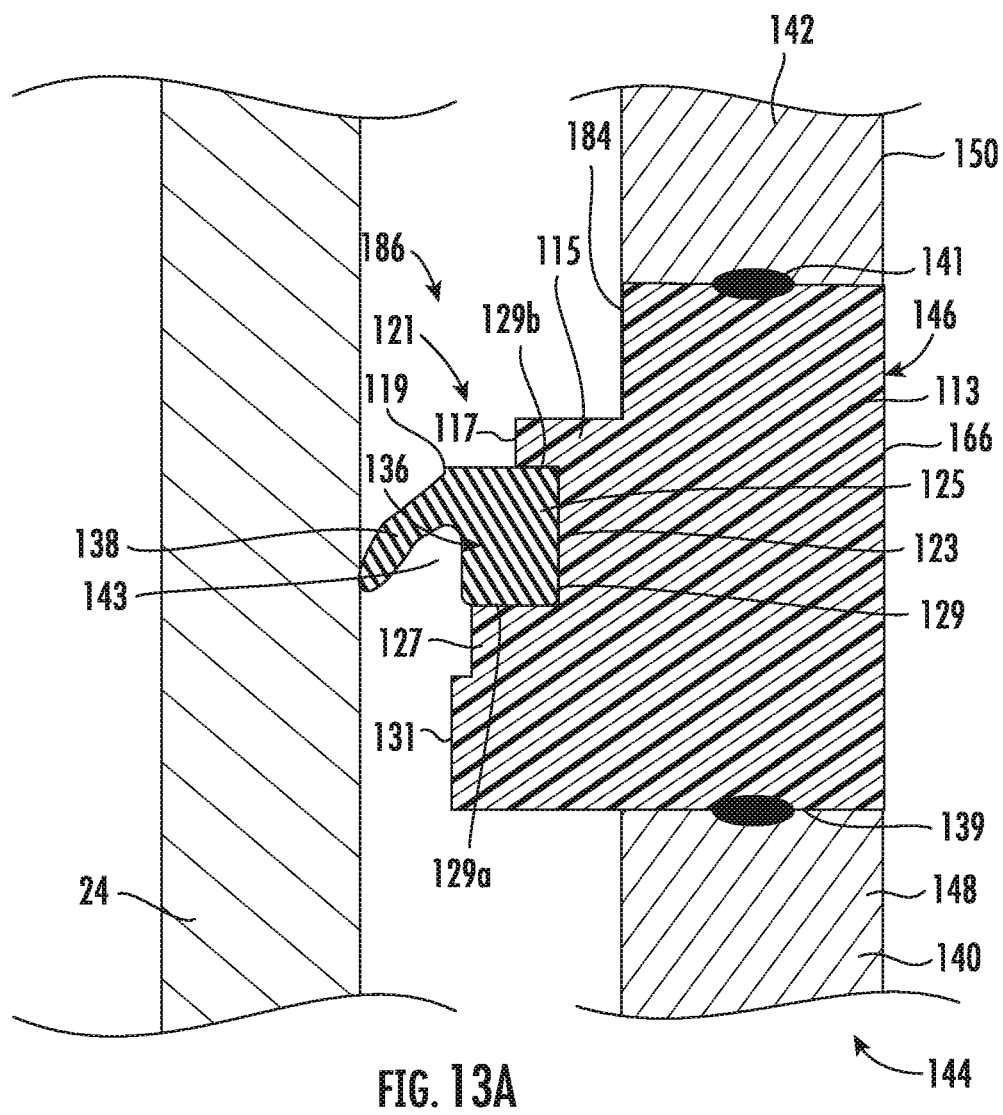
FIG. 13A is an enlarged view of a portion of FIG. 13 (the spacing between the riser pipe wall and the seal may not be to scale or the spacing is otherwise adjustable in FIGS. 13-15 among embodiments such has having a tighter riser pipe wall, but is illustrated for demonstrative purpose to better show features at the riser pipe sealing interface and better show positions or examples of seal roll out during filter cartridge extraction in FIGS. 14B and 14C (intermediate conditions) and FIGS. 14 and 14A (termination of the seal rolling out and filter extraction).
Figure 14A:
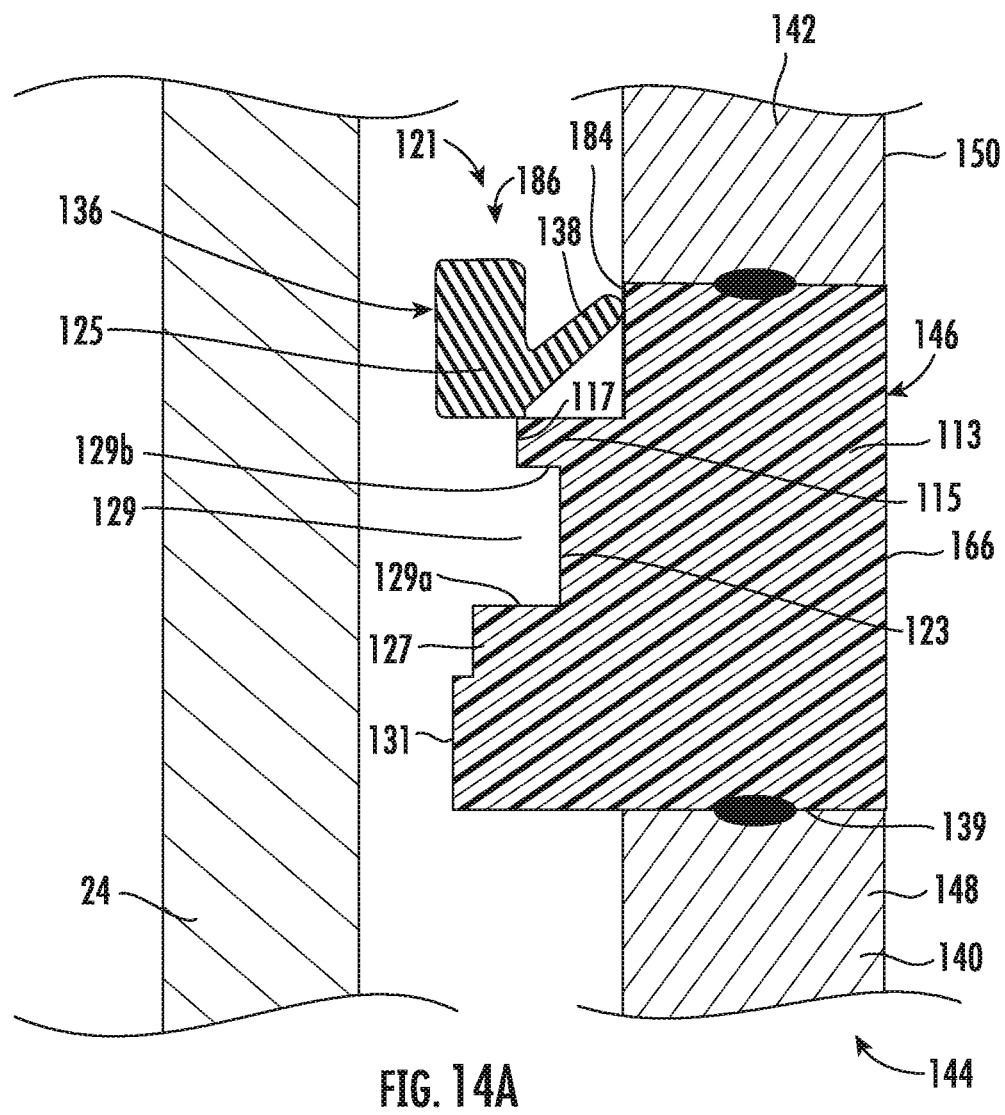
FIG. 14A is an enlarged view of part of FIG. 14.
Figure 14B:
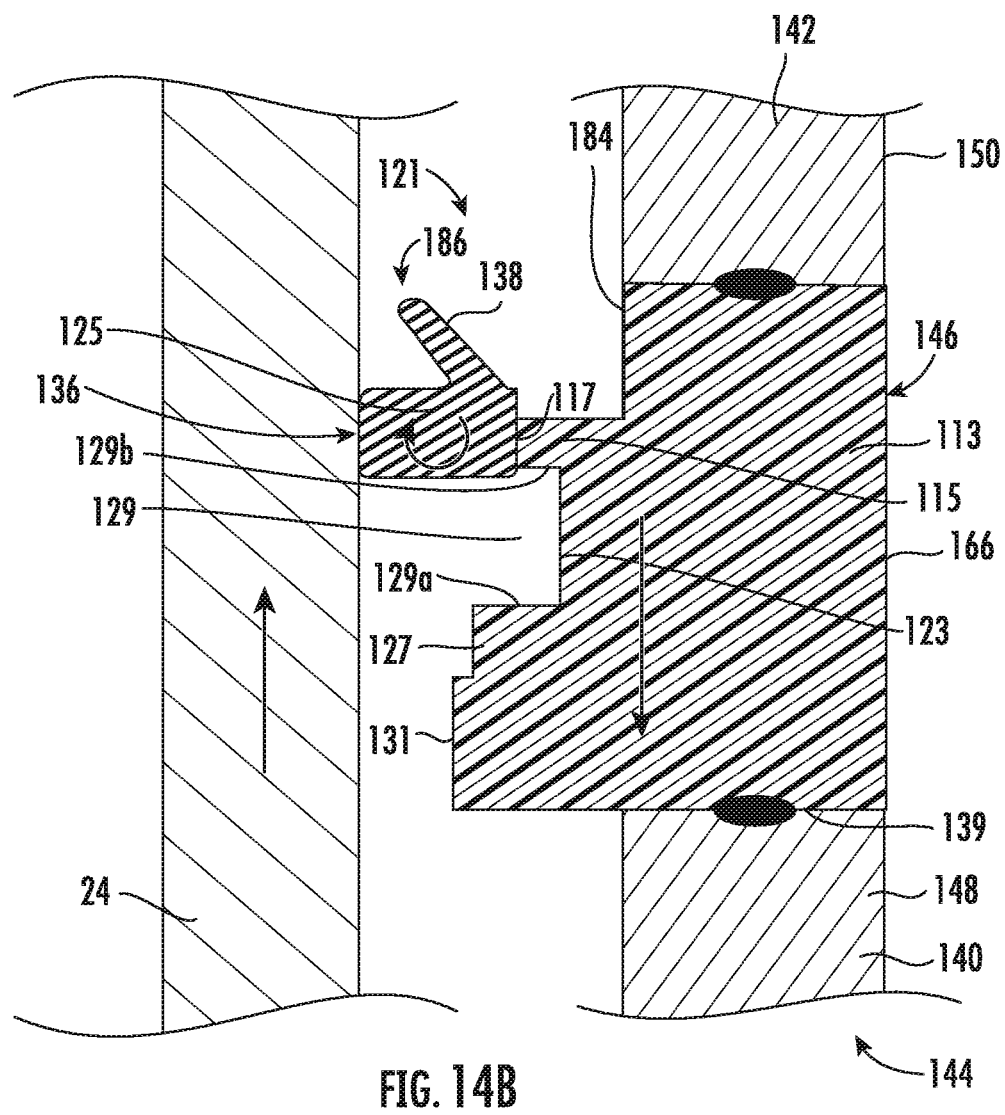
FIGS. 14B and 14C are enlarged views similar to that of FIG. 14A but shown with an arrow to schematically indicate pulling action with the seal ring rolled over into the clearance region but not as much as shown in FIG. 14A, to show other rolled over conditions of the seal ring that may be a progression of intermediate conditions of that between FIGS. 13 and 14.
Figure 14C:
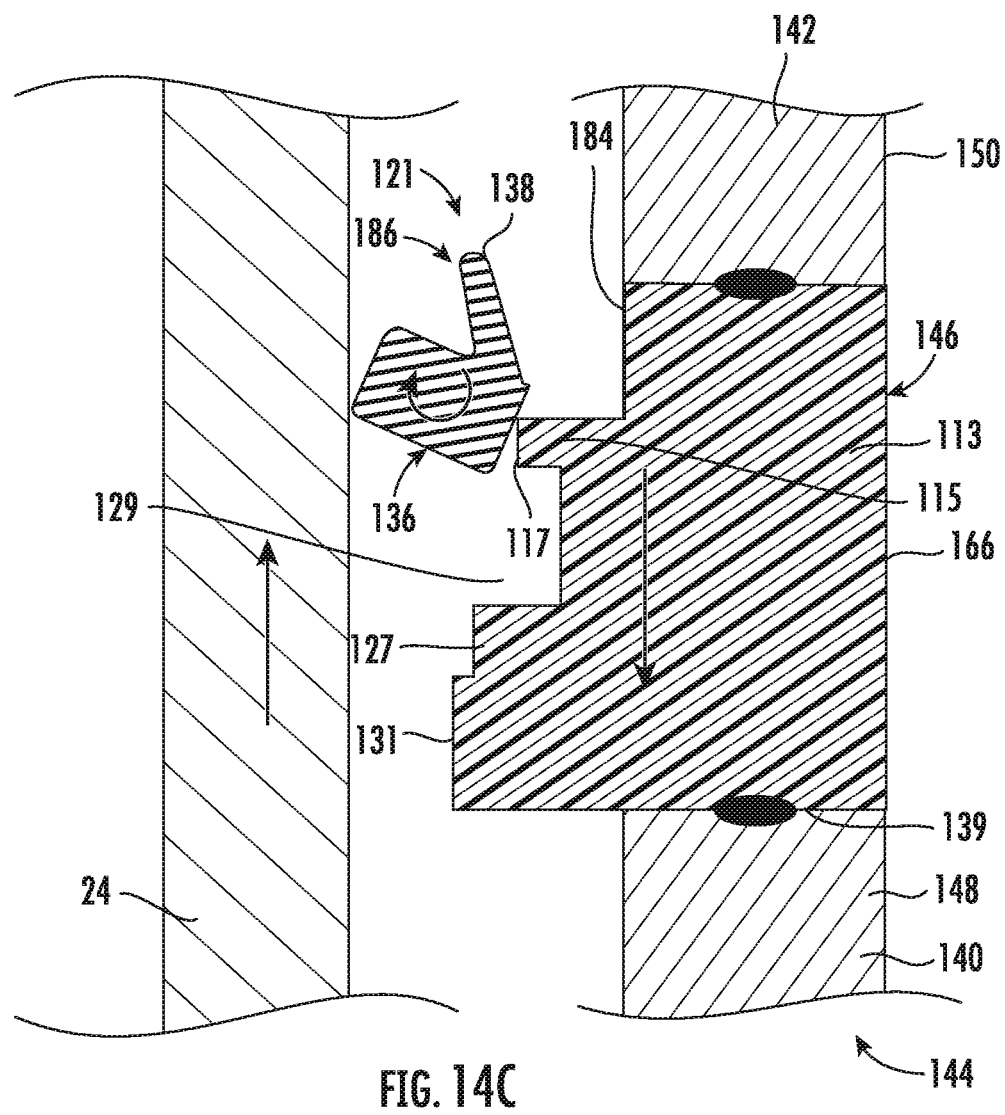

In the illustrated embodiment, the seal flange 138 is angled toward a direction toward the upstream side as shown in FIG. 13A, with the roll-out clearance region 186 being along a downstream side of the seal ring 136 and being of a smaller diameter than an outer diameter of the annular abutment ridge 127 and being sized to receive the seal ring 136 if rolled over, as has happened in FIG. 14A and/or to a lesser extent in FIGS. 14B and 14C due to the filter cartridge being pulled out for changing as schematically shown by arrows in FIGS. 14B and 14C.

As evident from the foregoing, the seal holder 146 is positioned axially between the first stage 140 and the second stage 142 of the filter media tube 144 with the seal flange 138 projecting at an angle toward the first stage 140 and away from the second stage 142, and with the roll-out clearance region 186 being arranged preferably only on the second stage 142.

This seal holder 146 also includes a central opening 166 providing fluid communication from the first stage 140 to the second stage 142. Further, like the earlier embodiment of FIGS. 2-3, this embodiment has first and second closed end caps 133, 135 at opposite ends of the filter media tube to close the first stage 140 and the second stage 142 at opposite ends, respectively. Preferably, wherein the first closed end cap 133 includes a handle 137 that facilitates manipulation by a service technician during installation and/or removal.

Like the earlier embodiment, in this cartridge 112, the filter media tube 144 comprises a first stage tube section 148, and a second stage tube section 150. In this embodiment, the seal holder 146 is configured as an open end cap assembly having the central opening 166 providing a flow passage and a first cap portion 139 secured to the first stage tube section 148 as via thermal welding, adhesive or other such bonding; and a second cap portion 141 secured to the second stage tube section, as via welding, adhesive or other such bonding. Thermal welding, adhesive or other such bonding is used also to connect the end caps 133, 135 to the respective tube sections 148, 150. In an end cap design for the seal holder, the seal holder axially spaces the first stage tube section and the second stage tube section by being axially interposed therebetween as shown for this embodiment. However a sleeve embodiment (wherein the filter media tube is a single continuous tube structure) is also contemplated and shown in FIG. 15 as previously noted.

While not limited thereto, one particularly beneficial type of seal ring 136 as illustrated is a chevron seal which includes on the one hand the annular base portion 126 mounted in the seal ring channel, and on the other the seal flange 138 projecting radially from the annular base portion and being canted relative to the base portion. This forms an annular pocket 143 therebetween.

By virtue of the foregoing, it is also evident that structural configurations of the outer periphery of body and/or the roll-out clearance regions 86, 186 of the various embodiments provide means along the seal holder and along the second stage for reducing extraction force by at least partly receiving the seal ring in a rolled over condition radially inward into the second stage during removal of the filter cartridge from the filter sealing sleeve. By rolled over condition, it is meant that all or part of the seal is at least partially removed from its original condition into the roll-out clearance region. A demonstrative example is illustrated of a rolled over condition schematically by comparing the seal ring 136 of FIG. 13A in the starting condition with an extracted condition in FIG. 14A and with intermediate conditions of FIGS. 14B and 14C (each of which show different rolled over conditions, although conditions that are even less than that shown for FIG. 14C that enter the roll-out clearance region would also be a rolled over condition). Thus, FIG. 13A shows starting position in use; FIG. 14B shows commencement of the rolling out of the seal as the filter and filter guide are coaxially translated relative to one another (filter extraction) (see arrows); FIG. 14C shows continuation of the rolling out result of continued filter extraction; and FIG. 14A show termination of the seal rolling out and filter extraction step.

Further, the ledge 115 may also or alternatively provide such reducing means by terminating at an outermost location radially inward and spaced radially inward of an innermost location the seal flange so as to at least partly (or fully) provide the extraction reducing means as an annular clearance space at least partly around the ledge. The reduced height of the ledge 115 provides less support to facilitate a roll over condition, whether it be partial or complete.

The rollout channels 86, 186 can also enable more easy extraction method. Such method can involve removing the filter cartridge from within the filtration assembly comprising: pulling the filter cartridge from the filter sealing sleeve while extruding the seal from a sealed position to a release position and in which the seal flange in an extruded states projects into the roll-out clearance region and projects toward the second stage to facilitate easier release of the filter cartridge from the filter sealing sleeve. Again, a demonstrative example is illustrated of a rolled over condition schematically in FIGS. 14 and 14A, with other intermediate rolled over conditions demonstratively shown in FIGS. 14B and 14C. It is understood that a tighter riser pipe wall clearance (e.g. smaller riser pipe diameter) and greater deflection of the seal may occur in FIGS. 13 and 13A when in sealing relationship and as such during extrusion and recalling that the seal is of elastomeric material, it may compress to a smaller radial width and can extrude through a smaller sized gap between the riser pipe and the ledge 115. Different inner diameter riser pipe and outer diameter seal spacing depending upon application may be employed in some embodiments. Such spacing between seals and riser pipes such as employed in commercial available Gemini® filtration vessels available from the present assignee and/or such as those examples in the background section for such vessel chevron seals can be used.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An assembly for fluid filtration, comprising:
a housing, and
at least one filtration element supported within the housing;
the housing including:
  i) an upstream housing portion with an inlet port for receiving a fluid stream to be filtered,
  ii) a downstream housing portion with an outlet port for discharging a filtered fluid stream,
  iii) a separation wall between the upstream and downstream housing portions, wherein the at least one filtration element is sealing and removably supported within an aperture of the fluid separation wall, enabling fluid entering the inlet port to flow into the at least one filtration element through an upstream portion of the filtration element and out of the at least one filtration element through a downstream portion of the at least one filtration element to the outlet port; and iv) a door on the upstream portion enabling access to the at least one filtration element, the upstream housing portion having an outer diameter that is smaller than an outer diameter of the downstream housing portion.

2. The assembly of claim 1, the outer diameter of the upstream housing portion is smaller than an outer diameter of the downstream housing portion so that that fluid exiting the element at the downstream portion has a lower velocity than fluid entering the at least one filtration element at the upstream portion.

3. The assembly of claim 1, wherein the housing comprises a filtration vessel having an open end at the upstream housing portion and a closed end at the downstream housing portion in axially spaced relation, with the at least one filtration element comprising a plurality of filtration elements extending horizontally within the filtration vessel in parallel fluid circuit with each filtration element comprising a first stage and a second stage, each filtration element comprising a ring seal in radial sealing engagement with a corresponding tubular sealing support riser of the separation wall to divide each filtration element into the first stage and the second stage, and wherein the inlet port extends radially through the upstream housing portion, and the outlet port extends radially through the downstream housing portion.

4. The assembly of claim 1, further including an inlet support grid and an outlet support grid spaced on opposite sides of the separation wall, the inlet support grid supporting the at least one filtration element along the upstream housing portion and the outlet support grid supporting the at least one filtration element along the downstream housing portion, the inlet support grid having a first outer diameter matched to the upstream housing portion and the outlet support grid having a second outer diameter matched to the downstream housing portion with the second outer diameter being larger than the first outer diameter.

5. The assembly of claim 4, wherein the separation wall has a separation wall diameter matched to that of the upstream housing portion and the first outer diameter, thereby being smaller than the second outer diameter.

6. The assembly of claim 1, further comprising a conical neck portion interposed between the downstream housing portion and the upstream housing portion with the conical neck section having spaced apart annular welds at different diameters that connect with respectively a smaller diameter cylindrical housing section and a larger diameter cylindrical housing section.

7. The assembly of claim 6, wherein the smaller diameter housing section entirely provides for the upstream housing portion and extends past the separation wall to form part of the downstream housing portion, wherein the door has a mating interface at a door mating diameter for mating with the upstream housing portion that is matched with the outer diameter of the upstream housing portion, and thereby the door mating diameter is less than the outer diameter of the downstream housing portion.

8. The assembly of claim 1, wherein the door mates with the upstream housing portion at a mating interface at a diameter that is at least 10% less than the outer diameter of the downstream housing portion.

9. The assembly of claim 1, wherein the outer diameter of the upstream housing portion is smaller than the outer diameter of the downstream housing portion by between 5 and 40%.

10. The assembly of claim 9, wherein the outer diameter of the upstream housing portion is between 0.15 and 3 meters; and the outer diameter of the downstream housing portion is between 0.2 and 3.5 meters.

11. The assembly of claim 1, wherein the outer diameter of the upstream housing portion is smaller than the outer diameter of the downstream housing portion by between 15 and 25%.

12. The assembly of claim 4, wherein the upstream housing portion transitions to a larger diameter to the downstream housing portion radially outward of the second stage and axially between the separation wall and the outlet support grid.

13. The assembly of claim 1, wherein the at least one filtration element, comprises:
a filter media tube;
a seal holder mounted to the filter media tube,
a seal ring supported by the seal ring holder and facing radially outwardly; and
wherein the filter media tube includes a first filter stage and second filter stage that is arranged fluidically downstream of the first stage with a predetermined flow path radially inwardly through the filter media tube at the first filter stage, axially inside of the tube toward the second filter stage and radially outwardly through the filter media tube at the second filter stage; and wherein the seal holder is positioned axially between the first stage and the second stage of the filter media tube.

14. The assembly of claim 13, wherein the seal ring is a radial seal including seal flange having an annular shape and projecting radially outwardly with the seal flange projecting at angle toward the first stage and away from the second stage, the roll-out clearance region being arranged only on the second stage.

15. The assembly of claim 14, wherein the at least one filtration element further comprises a roll-out clearance region provided by the seal ring holder on one side of the seal flange.

16. The assembly of claim 15, wherein the seal ring holder defines a ledge axially supporting the seal ring, the ledge terminating at an outermost location radially inward and spaced radially inward of an innermost location of the seal flange to provide the roll-out clearance region as an annular clearance space at least partly around the ledge, wherein the seal ring holder defines a seal seating surface adjacent the ledge, the seal seating surface radially supporting an inner periphery of the seal ring, and wherein the seal holder further comprises a recess region on a side of the ledge opposite the seal seating surface, the roll-out clearance region extending into the recess region, the recess region having a diameter less than the seating surface.

17. An assembly for fluid filtration, comprising:
a housing, and
a plurality of filtration elements supported within the housing in spaced relation;
the housing including:
i) an upstream housing portion with an inlet port for receiving a fluid stream to be filtered,
ii) a downstream housing portion with an outlet port for discharging a filtered fluid stream,
iii) a separation wall between the upstream and downstream housing portions, the separation wall being provided by a partition with openings having riser pipes mounted thereto, with each riser pipe defining an aperture; wherein each filtration element is sealing and removably supported within the aperture of a respective one of the riser pipes of the fluid separation wall, enabling fluid entering the inlet port to flow into the filtration elements through an upstream portion of the filtration elements and out of the filtration element through a downstream portion of the filtration elements to the outlet port; and iv) wherein the upstream housing portion has an outer diameter that is smaller than an outer diameter of the downstream housing portion.

18. An assembly of claim 17, further comprising a door on the upstream portion enabling access to the plurality of filtration elements, and wherein the door has a mating interface at a door mating diameter for mating with the upstream housing portion that is matched with the outer diameter of the upstream housing portion, and thereby the door mating diameter is less than the outer diameter of the downstream housing portion, and wherein the door mates with the upstream housing portion at a mating interface at a diameter that is at least 10% less than the outer diameter of the downstream housing portion.

19. The assembly of claim 17, wherein the housing comprises a filtration vessel having an open end at the upstream housing portion and a closed end at the downstream housing portion in axially spaced relation, with the filtration elements extending horizontally within the filtration vessel in parallel fluid circuit, with each filtration element comprising a first stage and a second stage, each filtration element comprising a ring seal in radial sealing engagement with a corresponding one of the riser pipes to divide each filtration element into the first stage and the second stage, and wherein the inlet port extends through the upstream housing portion, and the outlet port extends through the downstream housing portion.

20. The assembly of claim 17, wherein the separation wall has a separation wall diameter matched to that of the upstream housing portion and a first outer diameter, thereby being smaller than a second outer diameter of the downstream housing portion.

21. The assembly of claim 17, further comprising a conical neck portion interposed between the downstream housing portion and the upstream housing portion with the conical neck section having spaced apart annular welds at different diameters that connect with respectively a smaller diameter cylindrical housing section and a larger diameter cylindrical housing section.

22. The assembly of claim 17, wherein the outer diameter of the upstream housing portion is smaller than the outer diameter of the downstream housing portion by between 5 and 40%, and wherein the outer diameter of the upstream housing portion is between 0.15 and 3 meters; and the outer diameter of the downstream housing portion is between 0.2 and 3.5 meters.

23. The assembly of claim 17, wherein the outer diameter of the upstream housing portion is smaller than the outer diameter of the downstream housing portion by between 15 and 25%.

24. The assembly of claim 17, wherein the upstream housing portion transitions to a larger diameter to the downstream housing portion axially between the separation wall and an outlet support grid for the filtration elements.

* * * * *